J. Blackie,
Oil Pump,

Nº 50,893.   Patented Nov. 14, 1865

Witnesses:
P. P. Dodge
Geo. Burgess

Inventor:
J. Blackie
By H. C. Dodge
Attorney

UNITED STATES PATENT OFFICE.

JOHN BLACKIE, OF WASHINGTON, DISTRICT OF COLUMBIA.

IMPROVEMENT IN EJECTORS FOR DEEP WELLS.

Specification forming part of Letters Patent No. 50,893, dated November 14, 1865.

*To all whom it may concern:*

Be it known that I, JOHN BLACKIE, of Washington city, in the District of Columbia, have invented certain new and useful Improvements in Pumps for Oil-Wells and similar purposes; and I do hereby declare that the following is a clear, full, and exact description of the same, reference being had to the accompanying drawing, and to the letters of reference marked thereon, making part of this specification.

The nature of my invention consists, not broadly in the application of steam, heated air, or compressed air, as these are familiar agents long used for analogous purposes, but in the use of a pump composed of a series of chambers placed vertically one above another, into and from which the liquid is caused to flow by creating a vacuum therein or by the combined use of a vacuum and the pressure of a column of compressed air or steam.

To enable others skilled in the art to construct and use my invention, I will proceed to describe it.

A represents the body of the pump, which may consist of a metallic or other suitable tube of any required length, and which, for convenience in manufacture, may consist of a series of sections, screwed or otherwise properly joined together. This tube is divided by the plates or diaphragms *a* into a series of chambers, which may be of any required depth, not exceeding thirty feet, or the height to which the fluid will rise when the pressure of the atmosphere is removed from it.

Figure 1:
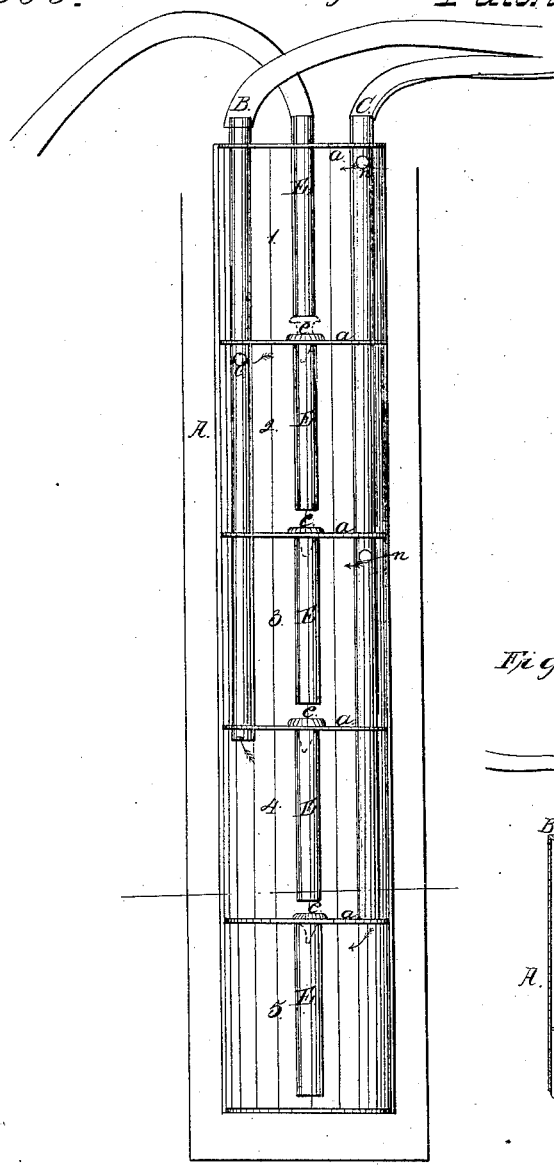

A tube, E, is inserted through a suitable opening in each of the diaphragms *a* in such a manner that the upper end of said tube E shall open into the chamber above, while its lower open end shall reach nearly to the bottom of the chamber below, as clearly shown in the drawing. These tubes are arranged in a vertical line, and the upper end of each is provided with a valve, *e*, which may be either a ball-valve secured in a suitable cage or frame to keep it in place; or it may be a simple disk provided with a stem extending down a short distance into the tube to keep it in place, as shown in the drawing, the valve, when raised, coming in contact with the lower end of the tube above, which thus prevents it from being lifted out of its proper place, as shown in red in chamber 1. Two other tubes, B and C, are inserted within the main tube A, one of which, C, extends down to the lowest chamber of the series, the other tube, B, ending in next to the lowest chamber, as shown in Fig. 1.

The tube C is provided with an opening, *n*, communicating with each alternate chamber, these openings in the drawing being shown communicating with the series of chambers numbered 1, 3, &c.

The tube B is provided with a similar series of openings communicating with the series of chambers numbered 2, 4, and so on to any extent to which it may be desired to extend the series of chambers.

The operation of the apparatus is as follows: The pump being properly inserted in the well, with its lower end immersed in the liquid to be raised, and the tubes B and C being connected with any suitable device by which a current of air can be alternately forced in and drawn out of the chambers, I proceed as follows: A current of compressed air is driven through the pipe, filling the chambers 1, 3, and 5, which, in the latter chamber, will press upon the oil therein and cause it to flow through the pipe E up into chamber No. 4. At the same time that this is being done the air is exhausted by the engine from tube B, and of course from the chambers 2 and 4, with which it communicates, thereby creating a vacuum therein, and thus assisting in raising the oil from the chamber below. By this step the oil will have been raised from chamber 5 up into chamber 4. Now, by reversing the movement and forcing air down tube B and withdrawing it from tube C a vacuum is created in the chambers 1, 3, and 5, and the pressure applied in chambers 2 and 4, which will cause the oil in 4 to flow up into 3, No. 5 being again filled from below. By continuing the process thus described it is obvious that at each reversal of the current of compressed air the oil will be elevated one chamber higher, until, having reached the top, it will flow out of the upper end of the upper tube, E. When the pump has been once filled by this process each alternate chamber in the series will be simultaneously filled and then simultaneously emptied at each reversal of the current of air, the oil flowing out of the upper tube, E, in a continuous stream.

It may be observed, that in practice the chambers are never entirely emptied of the liquid, but are nearly so.

Figure 3:
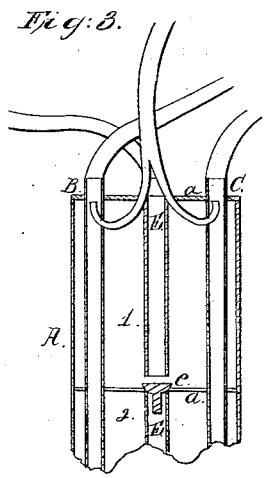
Figure 2:
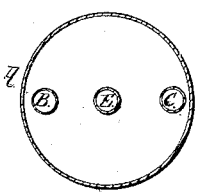

Instead of compressed air being forced through the tubes B and C into the various chamber, as described, a steam-tube may be inserted near the upper end of said tubes, having its mouth opening upward inside of them, as shown in Fig. 3. A current of steam being then forced through this inner tube will exhaust the air from the various chambers with which the openings in the exhaust-tube connect, thus forming a vacuum more or less complete which will cause the oil to flow up into the chambers thus made vacant, the apparatus thus arranged operating on the principle of the Giffard injector. By having the tubes B and C both connected with one steam-pipe having a branch leading to each and provided with a two-way cock it is obvious that the exhaust may be made alternately from one and the other of the tubes B and C and the chambers with which they connect.

In this method of operating my pump it is apparent that the oil will be elevated by the simple operation of creating a vacuum, or, in other words, by simply removing the atmospheric pressure from the surface of the oil first in one and then in the other set of chambers. By this arrangement the steam is not brought into contact with the oil at all, and hence is not condensed, as it would be if forced down the tubes and into the chambers.

In using compressed air it is obvious that a single tube, B or C, may be used instead of the two; but in that case the pump will be operated with only half as much force as when two tubes are employed, the oil being drawn into the chambers with which the tube connects by exhausting the air therefrom, and then driven from that into the chamber above by the pressure of a return-column of compressed air into the chamber from which it had been previously exhausted.

By heating the air employed the oil may be rendered still more liquid and made to flow more readily, besides rendering the valves less likely to become stationary by the gummy matter contained in the oil, and for this purpose the exhaust-steam of the engine may be used with cheapness and efficiency.

The advantages of my pump are manifold. When a pump of the ordinary construction is attempted to be used in an oil-well, which is generally several hundred feet deep, it is evident that a very great weight—that of the entire column of oil—has to be lifted by the piston and valve of the pump, and this severe labor causes great strain upon and rapid wear of the parts, and when once disabled it is with great difficulty, owing to the extreme depth of the wells, that the parts can be reached or removed for repairs. Again, it is obvious that the tube or barrel of the pump must be made very heavy, in order to sustain the great weight of such a long column of oil, and the wear upon the valves will be necessarily great, tending to disable them in a short time. By my invention these difficulties are obviated or greatly lessened. In the first place, the column of oil is divided into short sections corresponding with the length or height of the chambers, whereby each chamber and its valve has only the weight of the column in that chamber to support. In this way the weight of the entire column is divided into as many parts as there are chambers, and the strain upon the valves is lessened in the same manner and to the same extent, thereby greatly lessening the wear upon these parts. I also avoid the use of any piston or other rubbing parts, thus saving power and avoiding the wear of the piston and pump-tube, which in these deep wells is necessarily very great.

It is obvious that my pump may be used for raising any other liquid as well as oil, it being especially adapted to very deep wells of any kind.

Having thus fully described my invention, what I claim is—

1. A pump consisting of a series of chambers, in combination with the sectional tubes E, provided with valves $e$ and one or more air-tubes, constructed and arranged to operate substantially as and for the purpose herein set forth.

2. The process or method herein described, of elevating liquids by means of an alternate pressure in one set of chambers, in combination with a vacuum in the corresponding chambers, or by means of a pressure in one set of chambers alternating with the removal of the atmospheric pressure in the other set of chambers.

3. In combination with the pump herein described, the use of heated air, as and for the purpose set forth.

4. In combination with the pump constructed as described, the use of a steam-jet for the purpose of exhausting the air therefrom, substantially as set forth.

JOHN BLACKIE.

Witnesses:
THOS. M. WYATT,
JAMES J. DEAN.